US009299321B2

(12) United States Patent
Ohno

(10) Patent No.: US 9,299,321 B2
(45) Date of Patent: Mar. 29, 2016

(54) MULTI-PROJECTION SYSTEM

(71) Applicant: Kouji Ohno, Chiba (JP)

(72) Inventor: Kouji Ohno, Chiba (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/612,414

(22) Filed: Feb. 3, 2015

(65) Prior Publication Data

US 2015/0229890 A1 Aug. 13, 2015

(30) Foreign Application Priority Data

Feb. 13, 2014 (JP) ................................. 2014-025797
May 29, 2014 (JP) ................................. 2014-110887

(51) Int. Cl.
*H04N 3/223* (2006.01)
*H04N 9/31* (2006.01)
*G09G 5/14* (2006.01)

(52) U.S. Cl.
CPC .............. *G09G 5/14* (2013.01); *H04N 9/3147* (2013.01); *H04N 9/3182* (2013.01); *H04N 9/3194* (2013.01); *G09G 2300/026* (2013.01); *G09G 2356/00* (2013.01)

(58) Field of Classification Search
CPC ....... H04N 3/223; H04N 9/31; H04N 9/3167; H04N 9/3182; H04N 9/3194; G09G 5/14; G09G 2300/026; G09G 2356/00
USPC .......................................................... 348/747
See application file for complete search history.

(56) References Cited

U.S. PATENT DOCUMENTS

| 8,922,647 | B2* | 12/2014 | Crothers | G01B 21/045 348/135 |
| 2004/0184011 | A1* | 9/2004 | Raskar | G03B 21/26 353/94 |
| 2007/0171380 | A1* | 7/2007 | Wright | G03B 21/14 353/69 |
| 2008/0062164 | A1* | 3/2008 | Bassi | H04N 9/3147 345/214 |
| 2012/0007845 | A1* | 1/2012 | Tsuida | H04N 9/3129 345/207 |
| 2014/0168376 | A1 | 6/2014 | Hasegawa et al. | |

FOREIGN PATENT DOCUMENTS

| JP | 2008-187362 | 8/2008 |
| JP | 2009-086485 | 4/2009 |
| JP | 2012-142669 | 7/2012 |
| JP | 2013-041167 | 2/2013 |

* cited by examiner

*Primary Examiner* — Michael Lee
(74) *Attorney, Agent, or Firm* — Harness, Dickey & Pierce, P.L.C.

(57) ABSTRACT

A multi-projection system includes a plurality of projectors for projecting divided images onto projection positions to project an image composed of the divided images, a plurality of image capturing devices to capture the divided images and surrounding areas of the divided images, a projection position identification unit to identify projection positions of the projectors based on captured image information acquired by capturing position discriminating images and the surrounding areas, a receiving unit to receive a signal from each of the projectors, a number identification unit to identify the number of the projectors based on a reception result by the receiving unit, a determination unit to determine the position discriminating images to be projected by the projectors based on an identification result of the number identification unit, and a projection processing execution unit to instruct projection of the position discriminating images determined by the determination unit to the projectors.

7 Claims, 13 Drawing Sheets

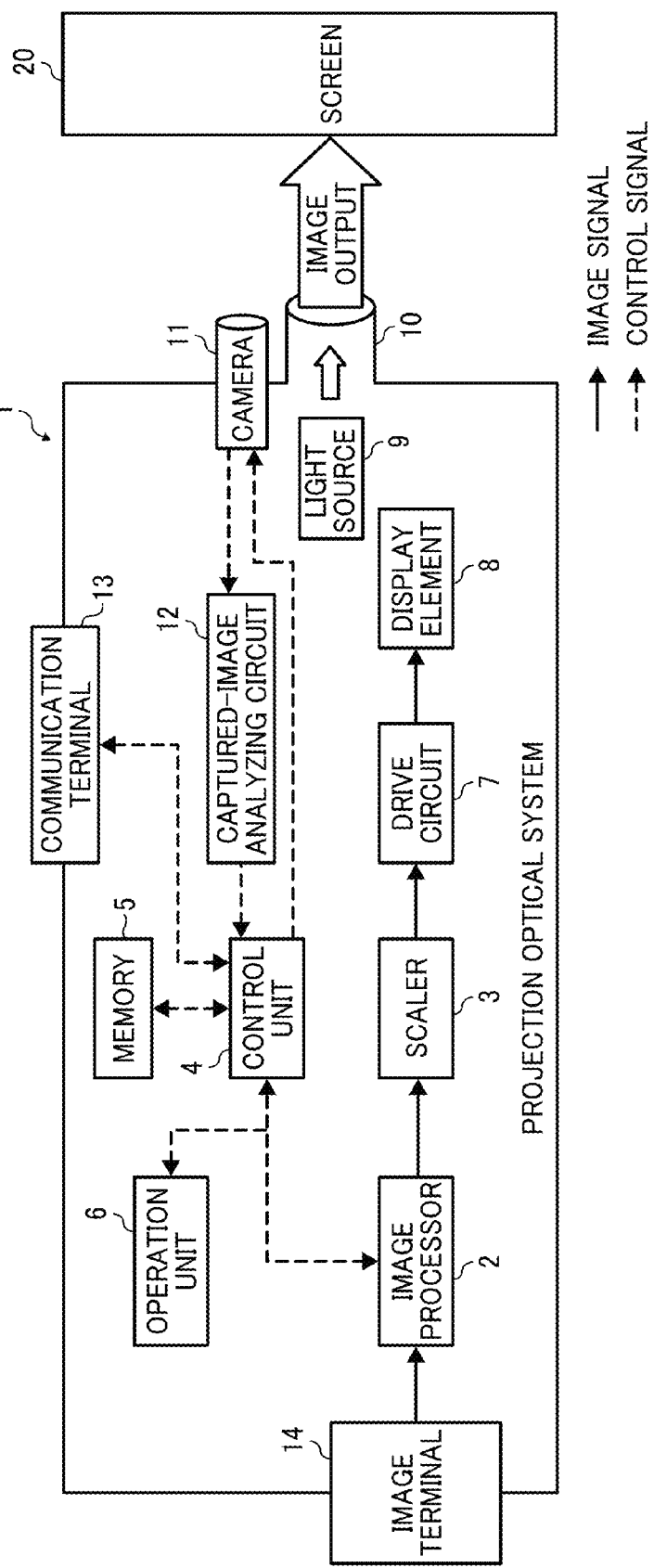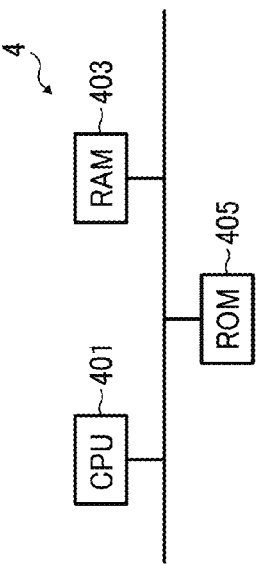

FIG. 13

| | GREEN | | | | | |
|---|---|---|---|---|---|---|
| GREEN | PURPLE/GREEN MIXED COLOR | RED/PURPLE/GREEN MIXED COLOR | RED/GREEN MIXED COLOR | PINK/RED/GREEN MIXED COLOR | PINK/GREEN MIXED COLOR | GREEN |
| | PURPLE/YELLOW/GREEN MIXED COLOR | | RED/BROWN/GREEN MIXED COLOR | | PINK/BLUE/GREEN MIXED COLOR | |
| | YELLOW/GREEN MIXED COLOR | | BROWN/YELLOW/GREEN MIXED COLOR | | BLUE/BROWN/GREEN MIXED COLOR | |
| | YELLOW/AQUA-BLUE/GREEN MIXED COLOR | | BROWN/GREEN MIXED COLOR | | BLUE/GREEN MIXED COLOR | |
| | AQUA-BLUE/GREEN MIXED COLOR | GREEN/AQUA-BLUE MIXED COLOR | GREEN | ORANGE/GREEN MIXED COLOR | BLUE/ORANGE/GREEN MIXED COLOR | |
| | | | | | ORANGE/GREEN MIXED COLOR | |
| | GREEN | | | | | |

70

MULTI-PROJECTION SYSTEM

CROSS-REFERENCE TO RELATED APPLICATION

This application claims priority pursuant to 35 U.S.C. §119(a) to Japanese Patent Application Nos. 2014-025797, filed on Feb. 13, 2014 and 2014-110887, filed on May 29, 2014 in the Japan Patent Office, the disclosure of which are incorporated by reference herein in their entirety.

BACKGROUND

1. Technical Field

The present invention relates to a multi-projection system using a plurality of projectors.

2. Background Art

With the advancement of image processing technologies and projection technologies, multi-projection systems using a plurality of projectors have been used for various scenes. For example, a multi-projection system can be used to project a large image on a large projection area such as a giant screen and a wall of a building, in which the image projection area is segmented into a plurality of segment areas (i.e., matrix of areas), and each one of a plurality of projectors projects a segment image onto respective each one of the segment areas to project one large image composed of a plurality of segment images.

SUMMARY

In one aspect of the present invention, a multi-projection system is devised. The multi-projection system includes a plurality of projectors, each one of the projectors useable for projecting each one of divided images onto a corresponding each one of projection positions mutually different in an image projection area to project an image composed of the divided images; a plurality of image capturing devices, each one of the image capturing devices disposed for each one of the projectors, to capture the divided image projected by each one of the projector and a surrounding area of the divided image; a projection position identification unit to identify a projection position of at least one or more of the plurality of projectors based on a plurality of captured image information acquired by capturing position discriminating images projected by the plurality of projectors onto mutually different projection positions and a surrounding area of the position discriminating images in the image projection area; a receiving unit to receive a given signal transmitted from each one of the plurality of projectors; a number identification unit to identify the number of the plurality of projectors based on a reception result of the given signal by the receiving unit; a determination unit to determine the position discriminating images to be projected by each one of the plurality of projectors based on an identification result of the number identification unit; and a projection processing execution unit to execute a process of projection of the position discriminating images determined by the determination unit to the plurality of projectors.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 2A is a block diagram of an electrical circuit of a projector employed for a MP system of FIG. 1.

FIG. 2B is a configuration of a control unit of FIG. 2A;

FIG. 13 is a schematic view of position discriminating images and peripheral projection patterns when a blackboard in a class room is used as an image projection target.

Figure 1:
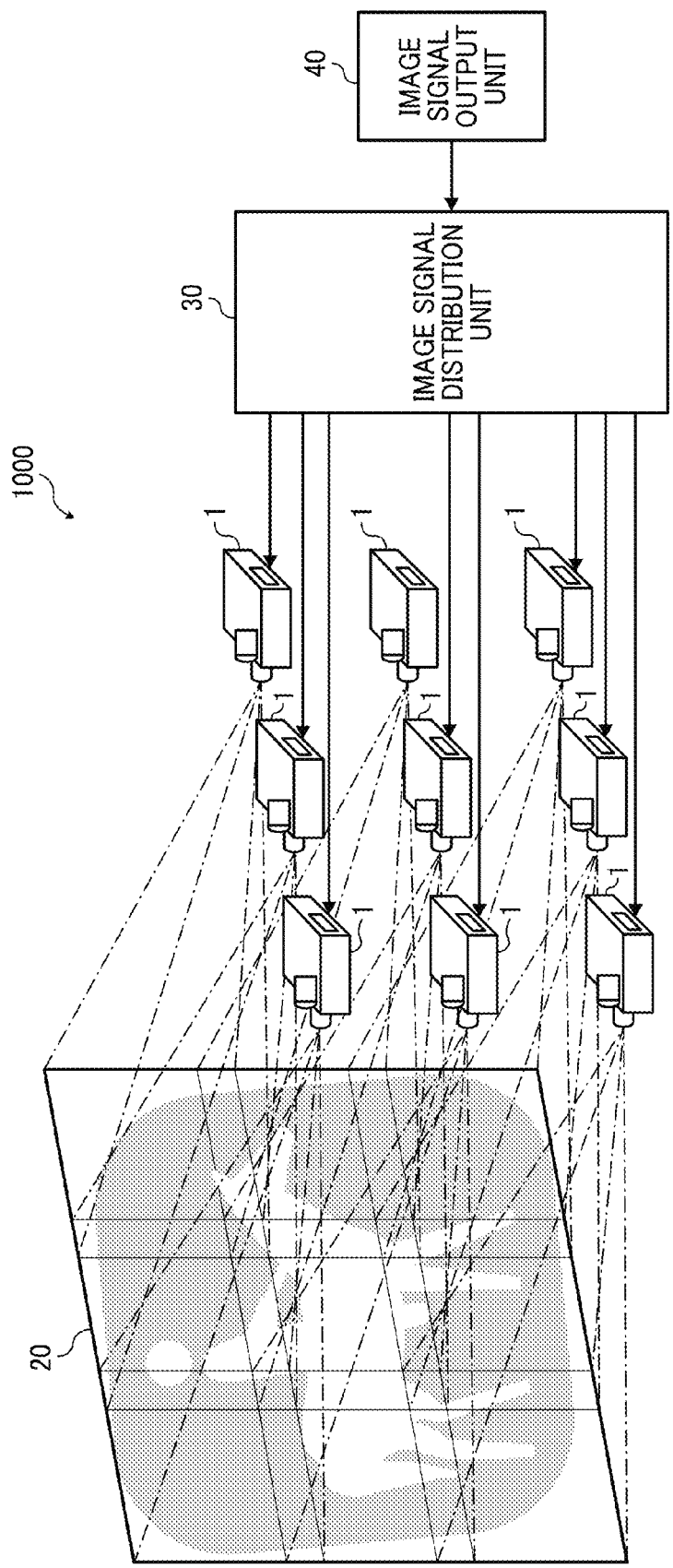
FIG. 1 is a schematic configuration of a multi-projection (MP) system according to one or more example embodiments.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of one or more exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to one or more example embodiments is described hereinafter.

A description is now given of a multi-projection (MP) system of one or more example embodiments. FIG. 1 is a schematic view of a configuration of a MP system 1000 according to one or more example embodiments. The MP system 1000 includes, for example, a plurality of projectors such as nine projectors 1, an image signal distribution unit 30, and an image signal output unit 40. In an example case of FIG. 1, the number of the projectors 1 is nine, but the number of the projectors 1 is not limited to any specific numbers, which means the number of the projectors 1 can be set two or more.

In an example case of FIG. 1, a projection face of a screen 20, useable as an image projection area, is segmented into a matrix of nine segment areas (3 segments×3 segments, or 3×3 segments), and each one of the nine projectors 1 projects a respective divided image of one image onto a respective segment area. It should be noted that a matrix of the image projection area is not limited to a matrix of 3×3 segments, but a matrix including two or more segments can be used.

For example, the image signal output unit 40 outputs image signals to the image signal distribution unit 30 to project a movie of a horse and a jockey as illustrated in FIG. 1. The image signals are converted into a plurality of divided image signals by the image signal distribution unit 30. Each of the divided image signals is output to each one of the respective nine projectors 1, and then projected onto the respective discrete segment area of the matrix to project a divided movie.

Each of the nine projectors 1 projects a movie corresponding to the divided image signal transmitted from the image signal distribution unit 30 onto a respective discrete segment area, with which one large movie such as a movie of a horse and a jockey, which is a combination of a plurality of divided movies, is projected onto the screen 20. Hereinafter, the segment area may be simply referred to as segment.

Further, instead of outputting the divided image signals to each one of the projectors 1, an original image signal can be output to each of the projectors 1, in which each of the projectors 1 converts the original image signal into a divided image signal used for displaying a divided movie on a projection position (or projection segment) set for each one of the projectors 1. In this configuration, each one of the projectors 1 is disposed with a circuit to conduct this conversion process, which may increase cost of the MP system compared to a configuration that the image signal distribution unit 30 converts an original image signal into divided image signals. From a viewpoint of cost, the image signal distribution unit 30 is used to reduce cost.

The image signal distribution unit 30 includes a memory, a storage device, or the like such as a hard disk to store data. This memory stores a plurality of position discriminant image data for discriminating which segment of a matrix corresponds to a projection position of which one of the projectors 1. Specifically, the memory stores a plurality of position discriminating image data as the discriminant image data.

The position discriminating image data is, for example, a rectangular single-color solid image, in which rectangular single-color solid images corresponding to a plurality of colors are stored in a memory circuit as a plurality of discriminant image data, which is to be displayed one by one. Other than rectangular single-color solid images of different colors, the position discriminating image can employ images having different patterns and/or shapes.

A line connecting the image signal distribution unit 30 and each of the nine projectors 1 is, for example, an image signal cable, and one end of the image signal cable is connected to an image terminal 14 (see FIG. 2A) of the projector 1.

FIG. 2A is a block diagram of an electrical circuit of the projector 1 employed for the MP system 1000. The projector 1 includes, for example, an image processor 2, a scaler 3, a control unit 4, a memory 5, an operation unit 6, a drive circuit 7, a display element 8, a light source 9, a projection optical system 10, a camera 11, a captured-image analyzing circuit 12, a communication terminal 13, and an image terminal 14. Based on an image signal input to the image terminal 14, a still image and/or a movie image can be projected onto the screen 20. In this description, the image includes, for example, still image, movie image, video image or the like.

An image signal output from the image signal output unit 40 is input to the image terminal 14 of the projector 1 via the image signal distribution unit 30, and then transmitted to the image processor 2. The image processor 2 converts the received image signal to a digital image signal, and outputs the digital image signal to the scaler 3. The scaler 3 determines the number of pixels in the vertical and horizontal directions of an image based on the contents of the digital image signal, and conducts an automatic scaling to display the input image with an optimal condition in view of an aspect ratio of the number of output-use pixels of the projector 1.

The drive circuit 7 drives the display device 8 based on the digital image signal, which is scaled by the scaler 3, and its synchronization signal. The display device 8 is, for example, a liquid crystal panel, a digital micro-mirror device (DMD) or the like. The display device 8 displays the scaled image by modulating light emitted from the light source 9 based on the scaled image. The projection optical system 10 includes a projection lens that projects the image displayed by the display device 8 onto the screen 20. The image projected on the screen 20 can be captured by the camera 11 useable as an image capturing device.

The control unit 4 is a micro-computer such as a processor or a processing circuitry including a computing circuit and a memory circuit such as a central processing unit (CPU) 401, a random access memory (RAM) 403, and a read only memory (ROM) 405 as illustrated in FIG. 2B. The control unit 4 controls operations and processes of the projector 1 as a whole, and conducts processes for setting various information and comparing information.

The operation unit 6 is, for example, a control panel disposed on a body of the projector 1. The operation unit 6 includes, for example, a key input unit, a key input unit of a remote transmission device, and a menu key for displaying a menu screen used for setting and selecting various information for the projector 1.

Figure 3A:
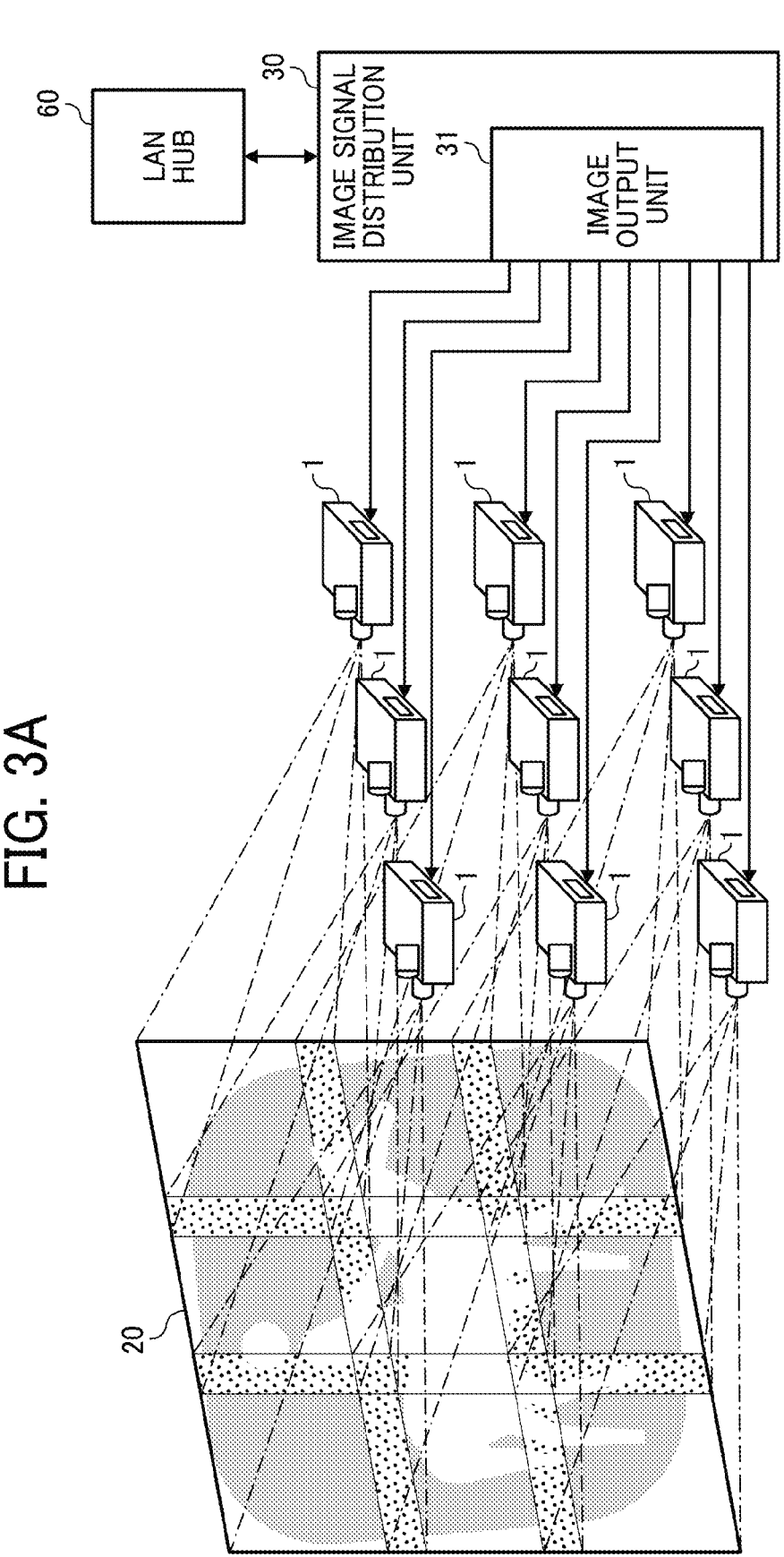
FIG. 3A is a connection condition of LAN cables for image signal for the MP system.

Further, one end of the image signal cable is connected to the image terminal 14 of the projector 1, and the other end of the image signal cable is connected to an image output unit 31 of the image signal distribution unit 30 (FIG. 3A). Further, one end of a local area network (LAN) cable, used as a communication cable, is connected to the communication terminal 13 of the projector 1, and the other end of the LAN cable is connected to a LAN HUB 60 to communicate various signals such as control signals.

Figure 3B:
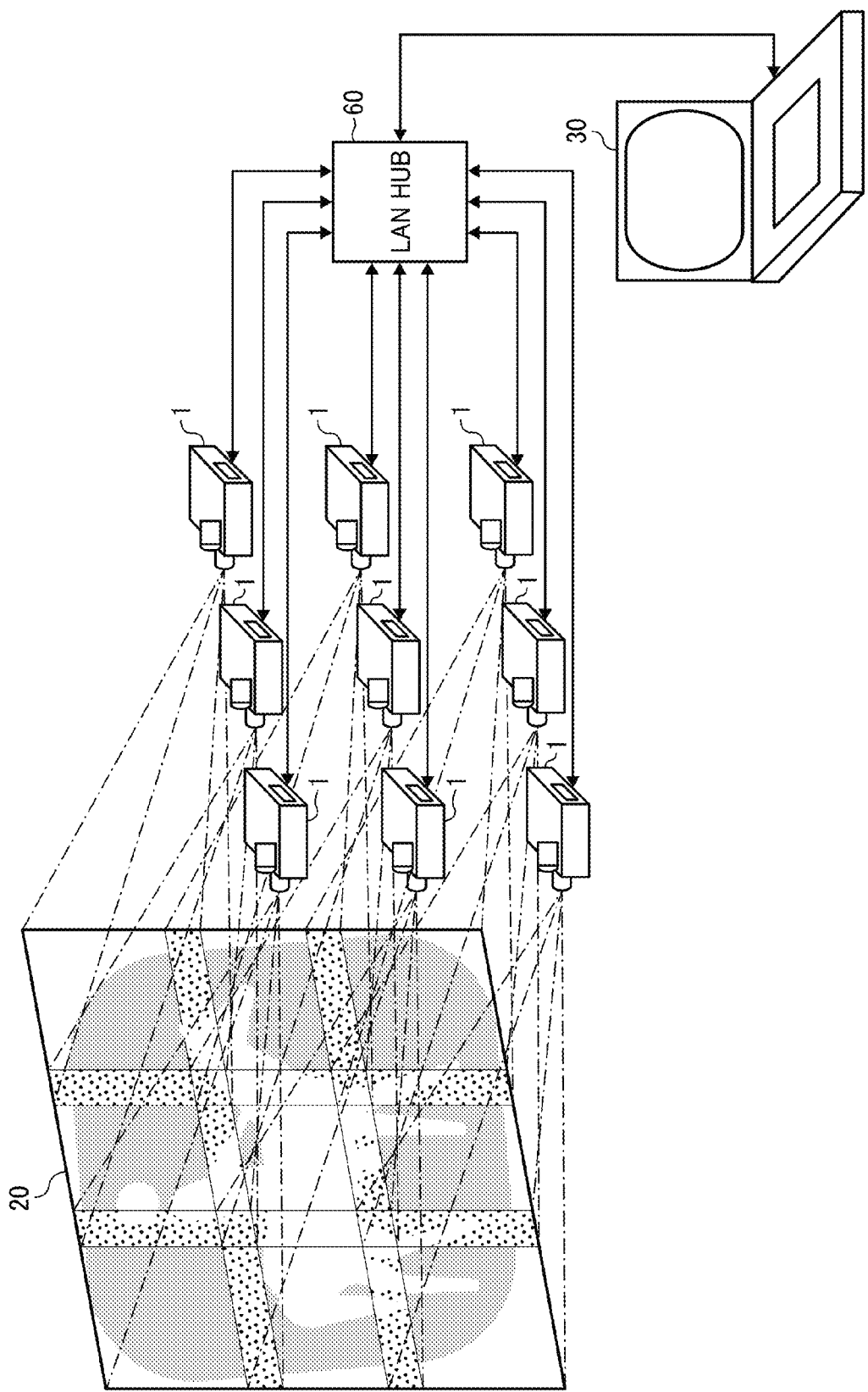
FIG. 3B is a connection condition of LAN cables for communication signal for the MP system.

FIG. 3B is a view of connection condition of LAN cables for communication signals in the MP system 1000. Each of the nine projectors 1 is connected to a LAN HUB 60 using LAN cables, with which each of the nine projectors 1 can communicate with the image signal distribution unit 30 via the LAN HUB 60. Further, instead of a wired communication using the LAN cable, wireless communication using wireless LAN can be employed, in which wiring work of the LAN cables by a worker can be omitted, with which work performance can be enhanced.

The image signal distribution unit 30 transmits mutually different discriminant image data to the nine projectors 1 via the image output unit 31 at a given timing. With this configuration, each one of mutually different position discriminating images are projected onto each one of segments of a matrix on the screen 20.

The position discriminating image projected onto the each segment and a surrounding area of the each segment can be captured by the camera 11 controlled by the control unit 4 of the projector 1 illustrated in FIG. 2, and the captured image information is transmitted to a captured-image analyzing circuit 12 of the projector 1. Based on the received image information, the captured-image analyzing circuit 12 identifies an image projection pattern around the position discriminating image (hereinafter, peripheral projection pattern), and outputs a result to the control unit 4. The peripheral projection pattern will be described in detail later.

The memory 5 that stores various data generated by the control unit 4 is, for example, a non-volatile memory, which can retain stored data even after the power of the projector 1 is turned OFF. Further, as to a projector of a MP system according to a variant example to be described later, information of projection position (i.e., projection segment) identified by the pattern identification processing, to be described later, can be stored in the memory 5.

Figure 5:
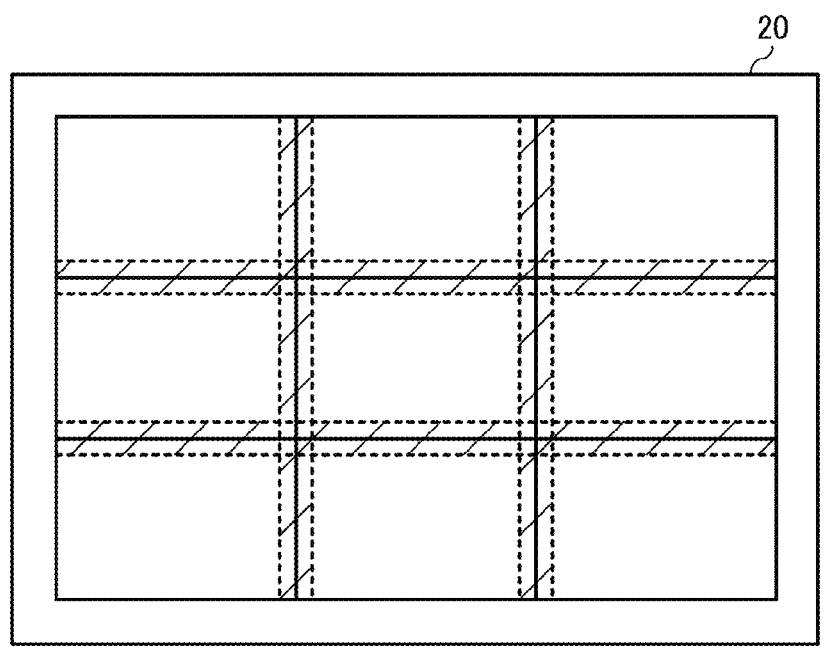
FIG. 5 is a schematic view on a screen indicating a first example of an overlapping area of divided images on the screen.

At a boundary of segments of a matrix segmented into 3×3 segments on the screen 20, an end portion of one divided image for one segment overlaps with an end portion of adjacent one divided image for adjacent segment as illustrated in FIG. 5. Because it is difficult to set an end of one divided image and an end of adjacent one divided image exactly on a boundary line of two adjacent segments by adjusting a projection position of each of the projectors 1, the end portions of two divided images of adjacent segments are overlapped with other. In FIG. 5, an area hatched by thick bold lines is an overlapping area where the end portions of the two adjacent divided images overlap with other.

Figure 4:
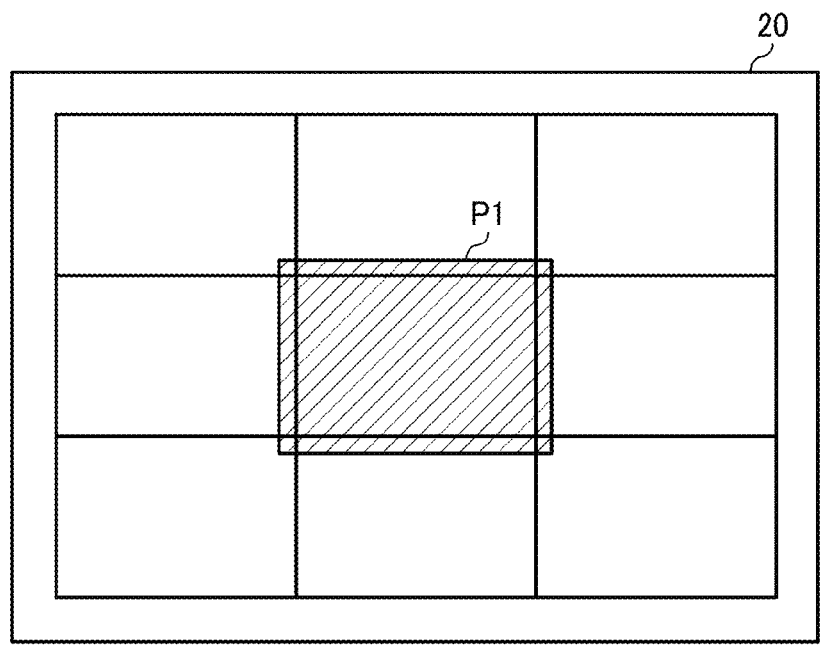
FIG. 4 is a schematic view on a screen indicating a relationship of projection segments and a position discriminating image.

FIG. 4 is a schematic view on the screen 20 indicating a relationship of a projection segment and a position discriminating image P1. As illustrated in FIG. 4, the position discriminating image P1 is projected on the screen 20 with a given size, which is a little greater than each segment of a matrix of 3 segments×3 segments. Therefore, an upper end portion of the position discriminating image P protrudes a little into an upper-side adjacent segment. Further, a right end portion of the position discriminating image P1 protrudes a little into a right-side adjacent segment. Further, a lower end portion of the position discriminating image P1 protrudes a little into a lower-side adjacent segment. Further, a left end portion of the position discriminating image P1 protrudes a little into a left-side adjacent segment. Further, a blank area is set at an upper end portion, a right end portion, a lower end portion, and a left end portion of the screen 20, wherein the blank area is not segmented. Similar to the position discriminating image P1, peripheral portion of divided images used for projecting a movie or a still image also protrude into adjacent segments.

FIG. 5 is a schematic view on the screen 20 indicating a first example of an overlapping area of divided images on the screen 20. In FIG. 5, a hatching area is an overlapping area where divided images of adjacent segments overlap with each other. As illustrated in FIG. 5, the overlapping area is an area that crosses over a boundary line of adjacent segments.

Figure 6:
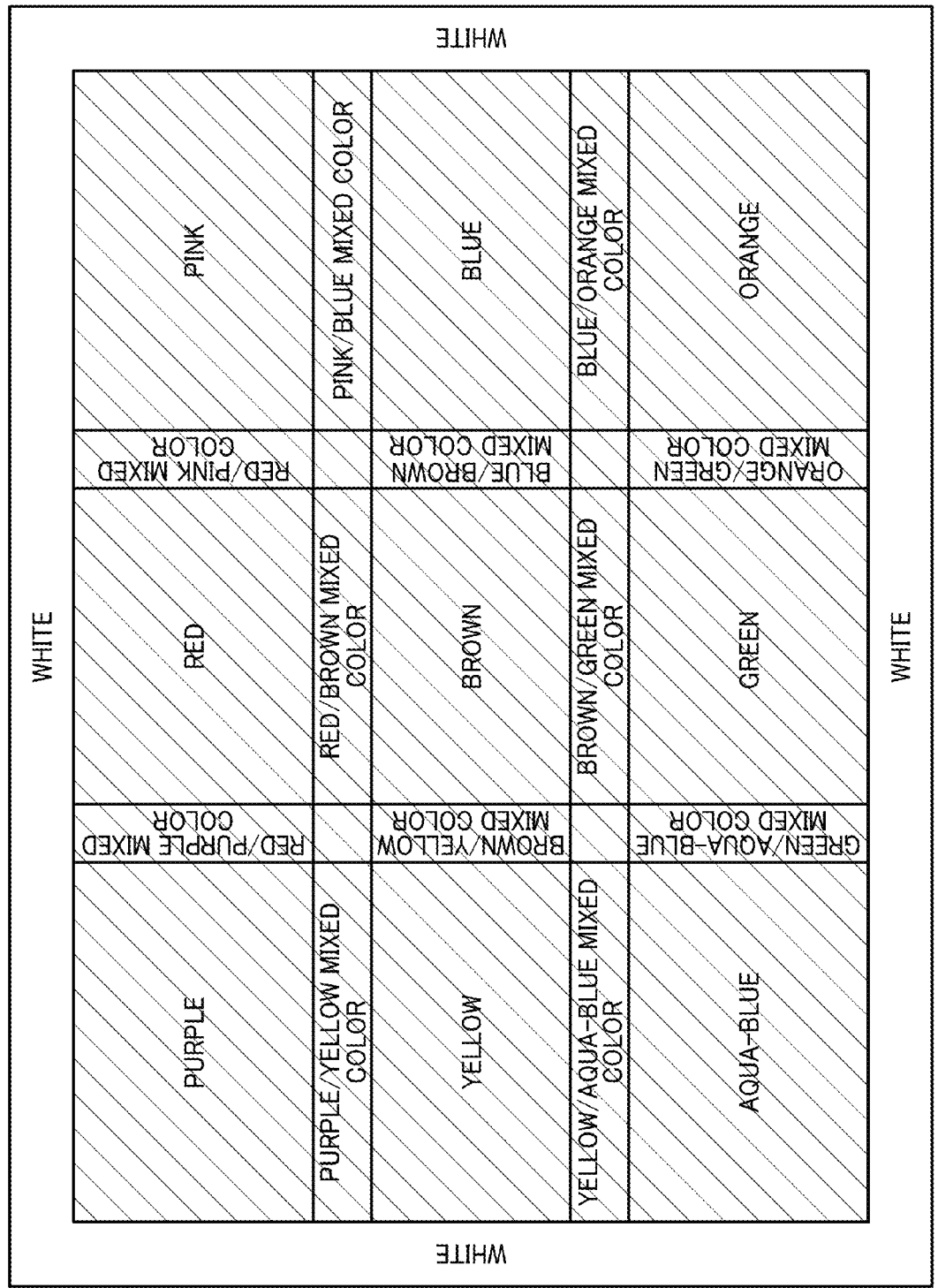
FIG. 6 is a schematic view on a screen indicating a relationship of position discriminating images and peripheral projection patterns.

FIG. 6 is a schematic view on the screen 20 indicating a relationship of position discriminating images and peripheral projection patterns. FIG. 6 is an example that the position discriminating image uses rectangular single-color solid images. When the nine projectors 1 project position discriminating images having mutually different colors to respective mutually different segments, an end portion of one position discriminating image for one segment overlaps with an end portion of a position discriminating image of an adjacent segment depending on segments.

For example, as to the center segment of the matrix of 3 segments×3 segment of FIG. 6, a brown-colored position discriminating image is projected onto the center segment, in which the color of the center portion of the position discriminating image is brown, which is original brown color, but the color of peripheral portion of the position discriminating image is mixed with a color of a position discriminating image of an adjacent segment, which means a color-mixed area.

In a case of FIG. 6, the upper end of a red/brown color-mixed area is also the upper end of the brown-colored position discriminating image. Therefore, an area higher than the upper end of the brown-colored position discriminating image is an area existing above the upper end of the brown-colored position discriminating image. In a case of FIG. 6, this area above the upper end of the brown-colored position discriminating image is projected with a red-colored position discriminating image, which is an adjacent segment adjacent to the center segment from the upper side of the center segment, in which the red-colored position discriminating image is an image of original red color.

In a case of FIG. 6, the right end of blue/brown color-mixed area is also the right end of brown-colored position discriminating image. Therefore, a right side area of the right end of blue/brown color-mixed area is an area existing at a right side of the brown-colored position discriminating image. This right side area is an adjacent segment adjacent to the center segment from the right of the center segment, and a blue-colored position discriminating image is projected on the adjacent segment, in which blue-colored position discriminating image is an image of an original blue color, Further, the lower end of brown/green color-mixed area is also the lower end of the brown-colored position discriminating image. Therefore, a lower side area of the lower end of brown/green color-mixed area is an area existing at a lower side of the brown-colored position discriminating image. This lower side area is an adjacent segment adjacent to the center segment from the lower of the center segment, and a green-colored position discriminating image is projected on the adjacent segment, in which the green-colored position discriminating image is an image of an original green color, Further, the left end of brown/yellow color-mixed area is also the left end of the brown-colored position discriminating image. Therefore, a left side area of the left end of brown/yellow color-mixed area is an area existing at a left side of the brown-colored position discriminating image. This left side area is an adjacent segment adjacent to the center segment from the left of the center segment, and a yellow-colored position discriminating image is projected on the adjacent segment, in which the yellow-colored position discriminating image is an image of an original yellow color, The segments at the upper end of the matrix do not have an adjacent segment at the upper side of the segments but have a blank area of white. The segments at the right end of the matrix do not have an adjacent segment at the right side of the segments but have a blank area of white. The segments at the lower end of the matrix do not have an adjacent segment at the lower side of the segments but have a blank area of white. The segments at the left end of the matrix do not have an adjacent segment at the left side of the segments but have a blank area of white.

Therefore, segments of position discriminating image that a white blank area exists above the upper side of the position discriminating image are positioned at the most upper end of the matrix (i.e., the first line of the matrix). Further, segments of position discriminating image that a white blank area exists at the right side of the position discriminating image are positioned at the right end of the matrix (i.e., the last row of the matrix). Further, segments of position discriminating image that a white blank area exists at the lower side of the position discriminating image are positioned at the lowest end of the matrix (i.e., the last line of the matrix). Further, segments of position discriminating image that a white blank area exists at the left side of the position discriminating image are positioned at the left end of the matrix (i.e., the first row of the matrix).

In a configuration of FIG. 2, based on image information acquired by capturing the position discriminating images and a surrounding or peripheral area of the position discriminating images by using the camera 11, the captured-image analyzing circuit 12 of the projector 1 identifies colors at the upper side, the right side, the lower side, and the left side of the brown-colored position discriminating image. Then, the captured-image analyzing circuit 12 configures data of color at the upper side, data of color at the right side, data of color at the lower side, and data of color at the left side arranged in a given sequence to generate peripheral projection pattern data, and outputs the peripheral projection pattern data to the control unit 4.

For example, as to the projector 1 projecting the brown-colored position discriminating image illustrated in FIG. 6, the captured-image analyzing circuit 12 configures peripheral projection pattern data of "red, blue, green, yellow, brown" and outputs the peripheral projection pattern data to the control unit 4. The brown included as the last parameter of the peripheral projection pattern data is not for a surrounding or peripheral area but the original color of the position discriminating image displayed at the center segment. When one of the projectors 1 is projecting an aqua-blue colored position discriminating image, the captured-image analyzing circuit 12 configures peripheral projection pattern data of "yellow, green, white, white, aqua-blue", and outputs the peripheral projection pattern data to the control unit 4.

Figure 7:
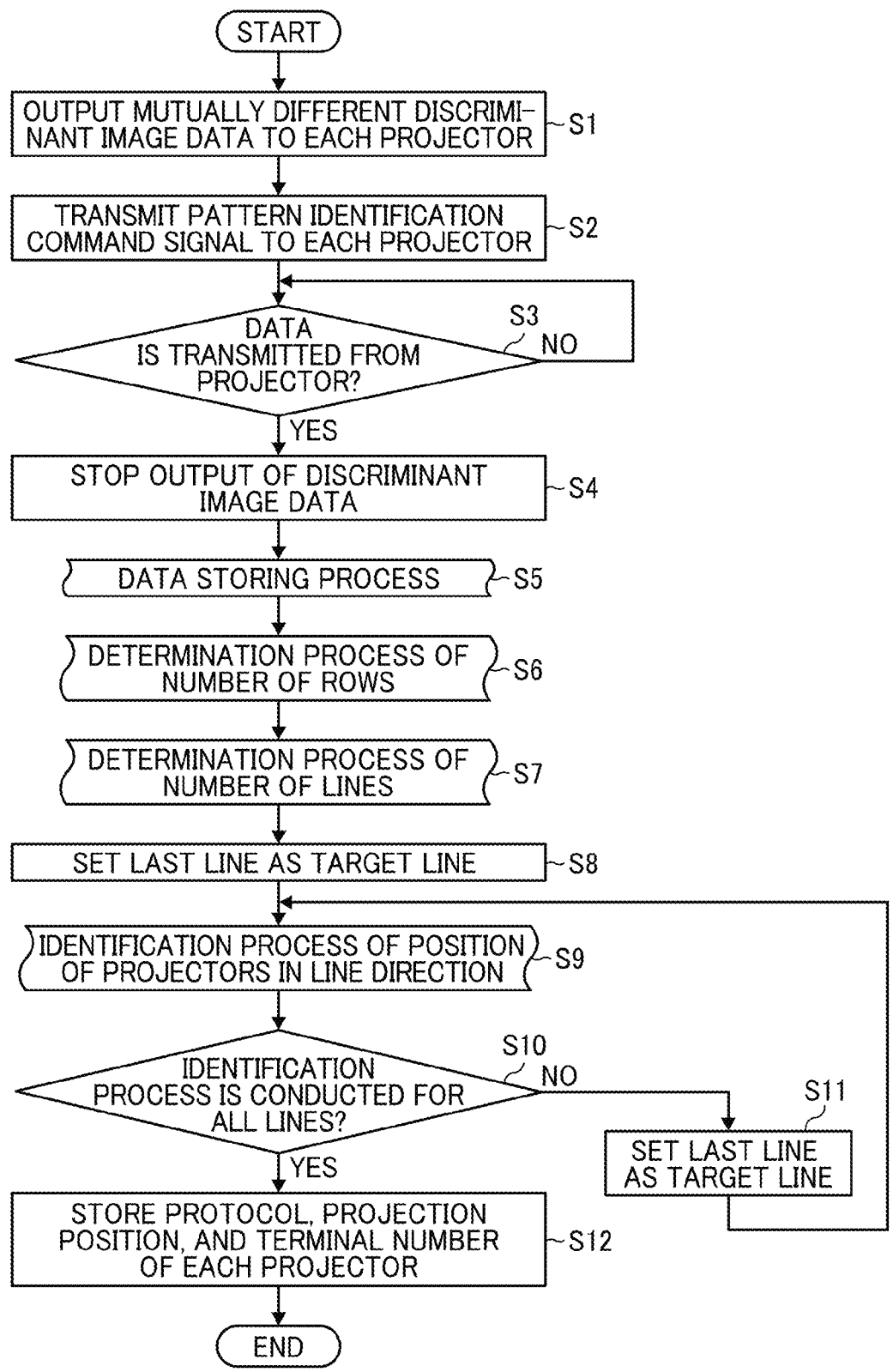
FIG. 7 is a flowchart showing the steps of a projection position identification processing conductible by an image signal distribution unit of the MP system.

FIG. 7 is a flowchart showing the steps of a projection position identification processing conductible by the image signal distribution unit 30. When a user or operator instructs a command of identifying projection position, the image signal distribution unit 30 starts the projection position identification processing. The image signal distribution unit 30 outputs mutually different discriminant image data to each one of a plurality of the projectors 1 so that each one of the plurality of the projectors 1 projects position discriminating images having mutually different colors to each segment of a matrix (step S1).

Further, before starting the projection position identification processing, the image signal distribution unit 30, useable as a projection position identification unit, acquires protocol data used as identification (ID) information via the communication terminal 13, useable as a receiving unit, to identify the number of the projectors 1 disposed in the MP system 1000.

Specifically, before starting the projection position identification processing, the image signal distribution unit 30 acquires given signals such as protocol signals from a plurality of the projectors 1 via the LAN cables. Because each of the protocol signals is unique to each of the projectors 1, the number of received protocol signals indicates the number of the projectors 1 disposed in the MP system 1000. Therefore, the image signal distribution unit 30 can identify the number of the projectors 1 connected to the image signal distribution unit 30 based on the received protocol signals.

At step S1, discriminant image data (e.g., fifty discriminant image data) stored in a hard disk is read and output to each of the projectors 1 with a given priority order. Specifically, a plurality of discriminant image data corresponding to the number of projectors 1 (i.e., the number of discriminant image data is corresponded to the number of the projectors 1) is read in the order from the highest priority from the stored discriminant image data, and are output to each of the corresponding projectors 1. Therefore, the image signal distribution unit 30 can function as a number identification unit that identifies the number of projectors 1 based on a reception result of protocol signals. Further, the image signal distribution unit 30 can also function as a determination unit that determines position discriminating images to be projected by a plurality of the projectors 1 based on an identification result of the number of projectors 1.

Then, the image signal distribution unit 30 outputs mutually different discriminant image data to image output terminals, corresponding to the number of projectors 1 and selected from the smallest number of terminal among a plurality of image output terminals disposed in the image output unit 31. As to the MP system 1000, it is defined that the image output terminals are selected from the smallest number of terminal among a plurality of image output terminals of the image output unit 31 to connect image signal cables to the projectors 1.

When the image signal distribution unit 30 starts outputting of discriminant image data, the image signal distribution unit 30 does not yet recognize what number of image output terminal is connected to which one of the projectors 1, but can recognize what number of image output terminal is connected to which one of the projectors 1 at step S12 to be described later.

After outputting the discriminant image data, the image signal distribution unit 30 transmits a pattern identification command signal to each of the projectors 1 using LAN-wired communication (step S2). At this stage, each of the projectors 1 already projects a position discriminating image based on discriminant image data onto a segment corresponding to each of the projectors 1. When each of the projectors 1 receives the pattern identification command signal, each of the projectors 1 conducts a pattern identification processing, to be described later, to identify a peripheral projection pattern. Then, each of the projectors 1 transmits peripheral identification pattern data and the protocol signal of each of the projectors 1 to the image signal distribution unit 30 using the LAN-wired communication.

When the peripheral identification pattern data is transmitted from all of the projectors 1 (step S3: Yes), the image signal distribution unit 30 stops an output of discriminant image data to each one of the projectors 1 (step S4), and then conducts a process of storing data (step S5). In this data storing process, a data table composed of a plurality of combinations of protocol data and peripheral identification pattern data (hereinafter, data combination) is stored in a memory, a storage device, or the like for each one of the projectors 1.

Then, the image signal distribution unit 30 conducts a determination process of the number of rows (step S6). In the determination process of the number of rows, among all of data combinations (e.g., nine combinations in a case of FIG. 6) stored in the data table, the number of data combinations that color information corresponding to a lower side area becomes white is identified, or the number of data combinations that color information corresponding to a upper side area becomes white is identified. Then, a result is stored as the number of rows. In an example case of FIG. 6, the number of rows is stored as "three"

Then, the image signal distribution unit 30 conducts a determination process of the number of lines (step S7). In the determination process of the number of lines, among all of data combinations (e.g., nine combinations in a case of FIG. 6) stored in the data table, the number of data combinations that color information corresponding to a right side area becomes white is identified, or the number of data combinations that color information corresponding to a left side area becomes white is identified. Then, a result is stored as the number of lines. In an example case of FIG. 6, the number of lines is stored as "three."

Then, the image signal distribution unit 30 sets the last line as a target line (step S8). For example, in a case of FIG. 6, the image signal distribution unit 30 sets the last line, which is the third line (i.e., lowest line), as the target line, and conducts an identification process of position of projectors in the line direction of the last line (step S9). In the identification process of position of projectors in the line direction, protocols of the projectors 1 that project position discriminating images onto segments of the rows of the target line are identified based on the data table, with which projection positions (i.e., projection segments) of the projectors 1 that project position discriminating images can be identified.

Specifically, at first, a data combination corresponding to the first row segment of the target line is identified from a plurality of data combinations. More specifically, a data combination having color information of the left side area is white, and color information of the lower side area that is same as the color of the lower side area of the first row segment of the target line is identified, and then projection position information (i.e., the first row segment of the target line) is added to the data combination. In this case, color information of the lower side area is the blank area (i.e., white) if the target line is the last line.

Further, when "the last line+one line" is set as the target line (e.g., the second line in FIG. 7), color information of the lower side area of the target line becomes the color set as the last parameter (i.e., color of position discriminating image) of the peripheral projection pattern data of one projector 1 used for projecting the position discriminating image to the first row segment of the last line, which is already identified. With this processing, the data combination corresponding to the first row segment of the target line is identified, and then the projection position information is added to the concerned data combination.

Then, a data combination corresponding to the second row segment of the target line is identified, and projection position information is added to the concerned data combination (i.e., the second row segment of the target line). Specifically, a data combination having color information of the left side area that is the same color set as the last parameter of the peripheral projection pattern data of the line identified most recently, and color information of the lower side area becomes the same color of the lower side area of the second row segment of the target line is identified. In this case, for example, if the target line is the last line, the color information of the lower side area is the blank area (i.e., white).

Further, when "the last line+one line" is set as the target line (e.g., the second line in FIG. 7), color information of the lower side area of the target line becomes the color set as the last parameter (i.e., color of position discriminating image) of the peripheral projection pattern data of one projector 1 used for projecting the position discriminating image to the first row segment of the last line, which is already identified.

The above described identification processing of data combination, and adding of projection position information to the data are conducted until the last row segment of the target line.

When the identification process of position of projectors in the line direction is completed, the image signal distribution unit 30 determines whether the identification process of position of projectors in the line direction is conducted for all lines in a matrix (step S10).

If the identification process of position of projectors in the line direction is not conducted for one or more lines (step S10: No), the image signal distribution unit 30 shifts a target line to a line, which is one line above the previous target line (step S11), and conducts the identification process of position of projectors in the line direction for the target line.

By contrast, if the identification process of position of projectors in the line direction is conducted for all lines in the matrix (step S10: Yes), data of terminal number is added to each data combination stored in the data table. Then, the data table is stored in a hard disk as data indicating protocol, projection position, and terminal number of each of the projectors (step S12).

The above mentioned terminal number is a number assigned to each one of a plurality of image output terminals of the image output unit 31, and is corresponded to each one of the projectors 1. The terminal number is identified as follows. Specifically, at the above described step S1, the image signal distribution unit 30 stores terminal color information indicating which color discriminant image data is output to which number of image output terminal among the image output terminals. Then, the color set as the last parameter of the peripheral projection pattern data is identified for each data combination stored in the data table, and a number of image output terminal corresponding to the color of the last parameter is identified from the above described terminal color information.

Figure 8:
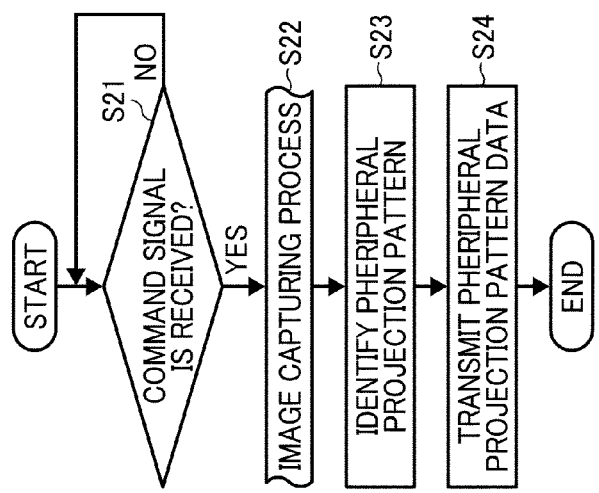
FIG. 8 is a flowchart showing the steps of pattern identification processing conductible by a control unit of a projector.

FIG. 8 is a flowchart showing the steps of pattern identification processing conductible by the control unit 4 of the projector 1. When a pattern identification command signal is transmitted from the image signal distribution unit 30 (step S21: Yes), the control unit 4 conducts an image capturing process to acquire image information of position discriminating image and a surrounding area of the position discriminating image captured by the camera 11 (step S22). Then, the control unit 4 identifies a peripheral projection pattern based on the image information (step S23), and transmits the peripheral projection pattern data to the image signal distribution unit 30 (step S24).

As described above, as to the MP system 1000, the image signal distribution unit 30 identifies the number of the projectors 1 based on identification (ID) information signals (e.g., protocols) transmitted from a plurality of the projectors 1. Then, the image signal distribution unit 30 determines position discriminating images to be projected by each of the projectors 1 so that mutually different position discriminating images are displayed by the projectors 1 corresponding to the identified number of the projectors 1, and conducts processing to project the images matched to a determination result. Specifically, at the above described step S1, mutually different discriminant image data are output to image output terminals, selected from a plurality of image output terminals disposed for the image output unit 31 in the order from the smallest terminal number while the number of image output terminals is matched to the number of the identified projectors 1.

Conventionally, an operator conducts a setting operation for each one of the projectors 1 one by one to project mutually different position discriminating images. By omitting this setting operation conducted by the operator by conducting the above described processing of the example embodiment, the burden of the operator can be reduced.

Figure 9:
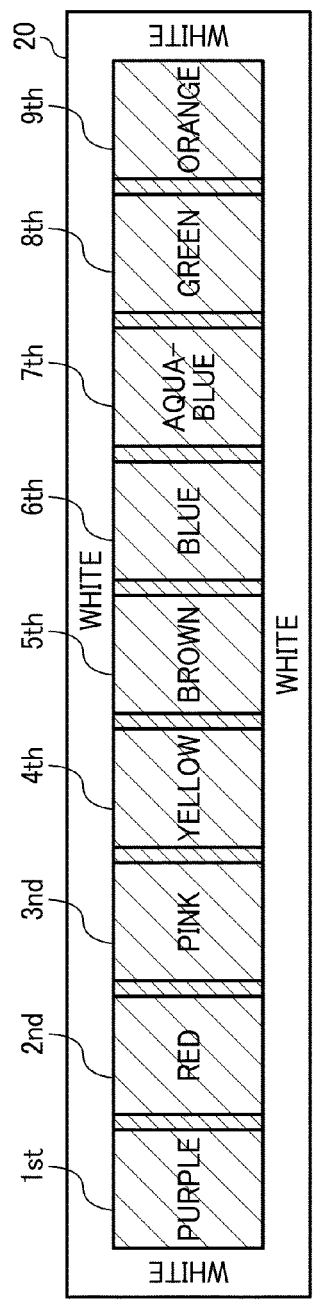
FIG. 9 is a schematic view of a screen indicating a second example of an overlapping area of divided images on a screen.

In a case of FIG. 6, a projection face on the screen 20 is segmented as a matrix of 3×3 segments, but the matrix is not limited hereto. For example, as illustrated in FIG. 9, the screen 20 having a land scape shape can be segmented into a matrix of 1×9 segments, and mutually different divided images can be projected onto each of the segments.

In this case, as to a position discriminating image projected onto the first row segment, a position discriminating image of an adjacent segment is projected only onto the right side area of the position discriminating image projected onto the first row segment among the peripheral of the position discriminating image. This projection pattern occurs only to the first row segment. Further, as to a position discriminating image projected onto the ninth row segment, a position discriminating image of an adjacent segment is projected only onto the left side area of the position discriminating image projected onto the ninth row segment among the peripheral of the position discriminating image. This projection pattern occurs only to the ninth row segment.

However, as to each of the 2nd, 3rd, 4th, 5th, 6th, 7th, and 8th row segment, a position discriminating image of an adjacent segment is projected onto the right side area and the left side area of the position discriminating image of the 2nd, 3rd, 4th, 5th, 6th, 7th, and 8th row segments. In this case, if the projection position is identified just by determining existence or not existence of a position discriminating image at the surrounding area, which is conducted for conventional MP systems, peripheral projection pattern data becomes the same one for these seven segments, in which the peripheral projection pattern data is configured of "not exist (upper side area), exist (right side area), not exist (lower side area), and exist (left side area)," and thereby the projection position cannot be identified for these seven segments. Therefore, as to conventional MP systems, when an image projection area is segmented into four or more segments in the vertical direction or the horizontal direction, projection position cannot be identified for some of the segments of the matrix.

As to the MP system 1000 according to one or more example embodiments, peripheral projection pattern data is not configured by just determining existence or not existence of position discriminating image at the surrounding area. Specifically, peripheral projection pattern data is configured with color of position discriminating images surrounding one position discriminating image. With this configuration, even when an image projection area is segmented into four or more segments in the vertical direction or the horizontal direction, peripheral projection pattern data can be set differently for all of the segments, and can identify positions of each of the segments (i.e., projection position).

For example, in an example case of FIG. 9, peripheral projection pattern data for the second row segment is configured with "white (upper side area), pink (right side area), white (lower side area), purple (left side area), and red (center)." Further, peripheral projection pattern data for the third row segment is configured with "white (upper side area), yellow (right side area), white (lower side area), red (left side area), and pink (center)". Further, peripheral projection pattern data for the fourth row segment is configured with "white (upper side area), brown (right side area), white (lower side area), pink (left side area), and yellow (center)". Further, peripheral projection pattern data for the fifth row segment is configured with "white (upper side area), blue (right side area), white (lower side area), yellow (left side area), and brown (center)". Further, peripheral projection pattern data for the six row segment is configured with "white (upper side area), aqua blue (right side area), white (lower side area), brown (left side area), and blue (center)". Further, peripheral projection pattern data for the seventh row segment is configured with "white (upper side area), green (right side area), white (lower side area), blue (left side area), and aqua blue (center)". Further, peripheral projection pattern data for the eighth row segment is configured with "white (upper side area), orange (right side area), white (lower side area), aqua blue (left side area), and green (center)". Therefore, all of the peripheral projection pattern data becomes mutually different. Therefore, even if an image projection area is segmented into four or more segments in the vertical direction or the horizontal direction, projection positions can be identified for all of the projectors.

A description is given of a variant example of MP system 1000a according to one or more example embodiments, which changes a part of the configuration of the MP system 1000. A hardware configuration of the MP system 1000a of the variant example is same as the above described MP system 1000 except some points.

The MP system 1000a of the variant example does not include an image signal distribution unit, in which image signal cables connected to a plurality of the projectors 1 are connected to an image output unit of the image signal output unit 40, with which the image signal output unit 40 outputs an original image signal to each one of a plurality of the projectors 1. Each one of the projectors 1 converts the original image signal transmitted from the image signal output unit 40 into a divided image signal used for projecting a divided movie onto a projection position corresponding to each one of the projectors 1, and projects the divided image (divided movie) onto the screen 20.

Each of a plurality of the projectors 1 includes the control unit 4 having a memory circuit that stores a plurality of discriminant image data used for projecting mutually different position discriminating images. When a user or operator inputs a position identification command signal to the operation unit 6 of the projector 1, the control unit 4 of each one of the projectors 1 starts a position identification processioning to be described later.

Then, among a plurality of discriminant image data stored in the memory circuit, an image signal corresponding discriminant image data is output to the image processor 2. With this configuration, one position discriminating image is projected onto one of segments of a matrix on the screen 20. The projected position discriminating image and the surrounding area of the projected position discriminating image are captured by the camera 11 controlled by the control unit 4, and the captured image information is transmitted to the captured-image analyzing circuit 12. Based on the received image information, the captured-image analyzing circuit 12 identifies a peripheral projection pattern indicating an image projection pattern around the position discriminating image, and outputs a result to the control unit 4.

Figure 10:
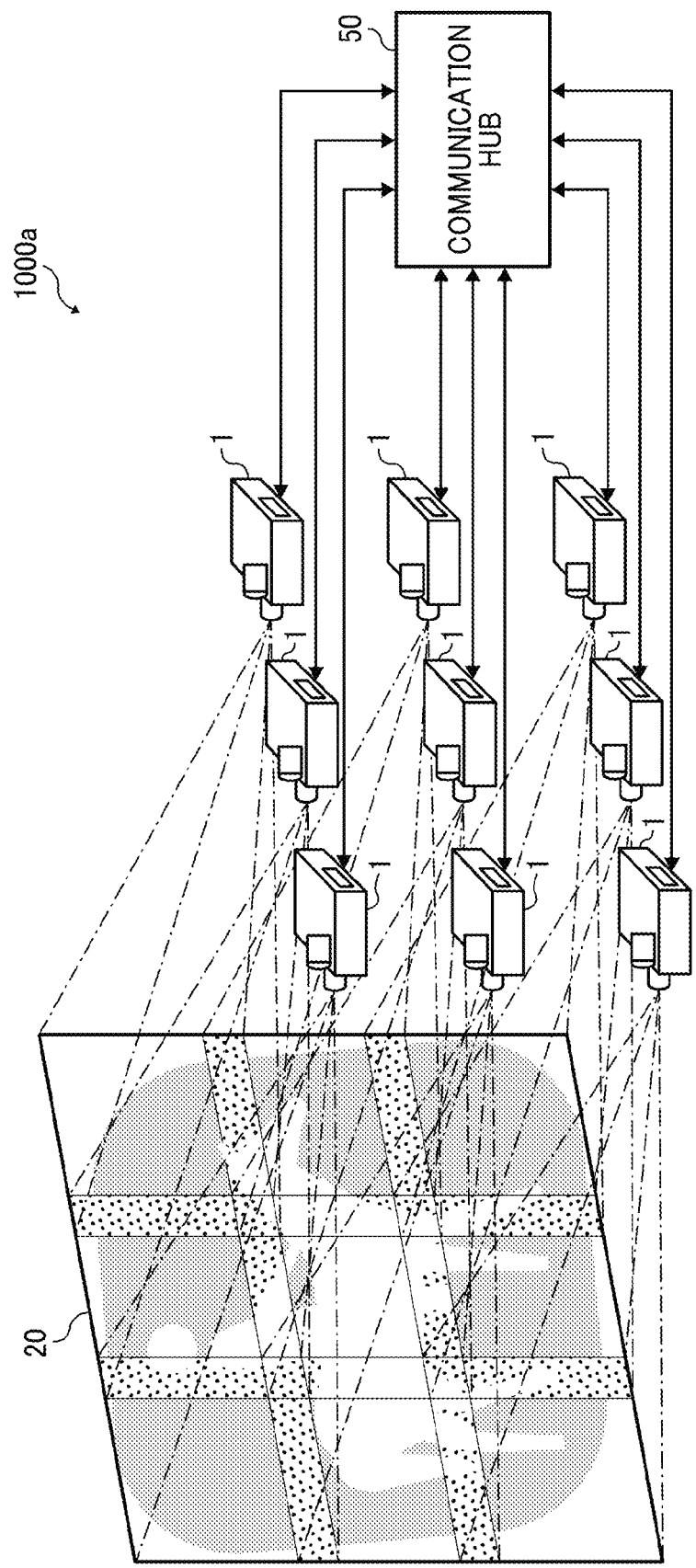
FIG. 10 is a schematic view of a MP system of a variant example showing connection condition of communication cables.

FIG. 10 is a schematic view of the MP system 1000a of the variant example illustrating a connection pattern of communication cables, in which one end of the communication cable is connected to the communication terminal 13 of the projector 1, and the other end of the communication cable is connected to a communication HUB 50. The communication cable is used to communicate various signals such as control signals. As illustrated in FIG. 10, each one of the nine projectors 1 is connected to the communication HUB 50 by using a dedicated communication cable. Under this connection pattern, the nine projectors 1 can communicate with each other via the communication HUB 50. Further, instead of wired communication using the communication cable and the communication HUB 50, wireless communication can be employed. In this case, wiring work of the communication cables by a worker can be omitted, with which work performance can be enhanced.

When an user or operator inputs a position identification command signal to the operation unit 6 in one of the nine projectors 1, this one projector 1 transmits the position identification command signal to other projectors 1 via wired communication using communication cable, with which each one of the nine projectors 1 can start a position identification processing almost at the same timing.

Figure 11:
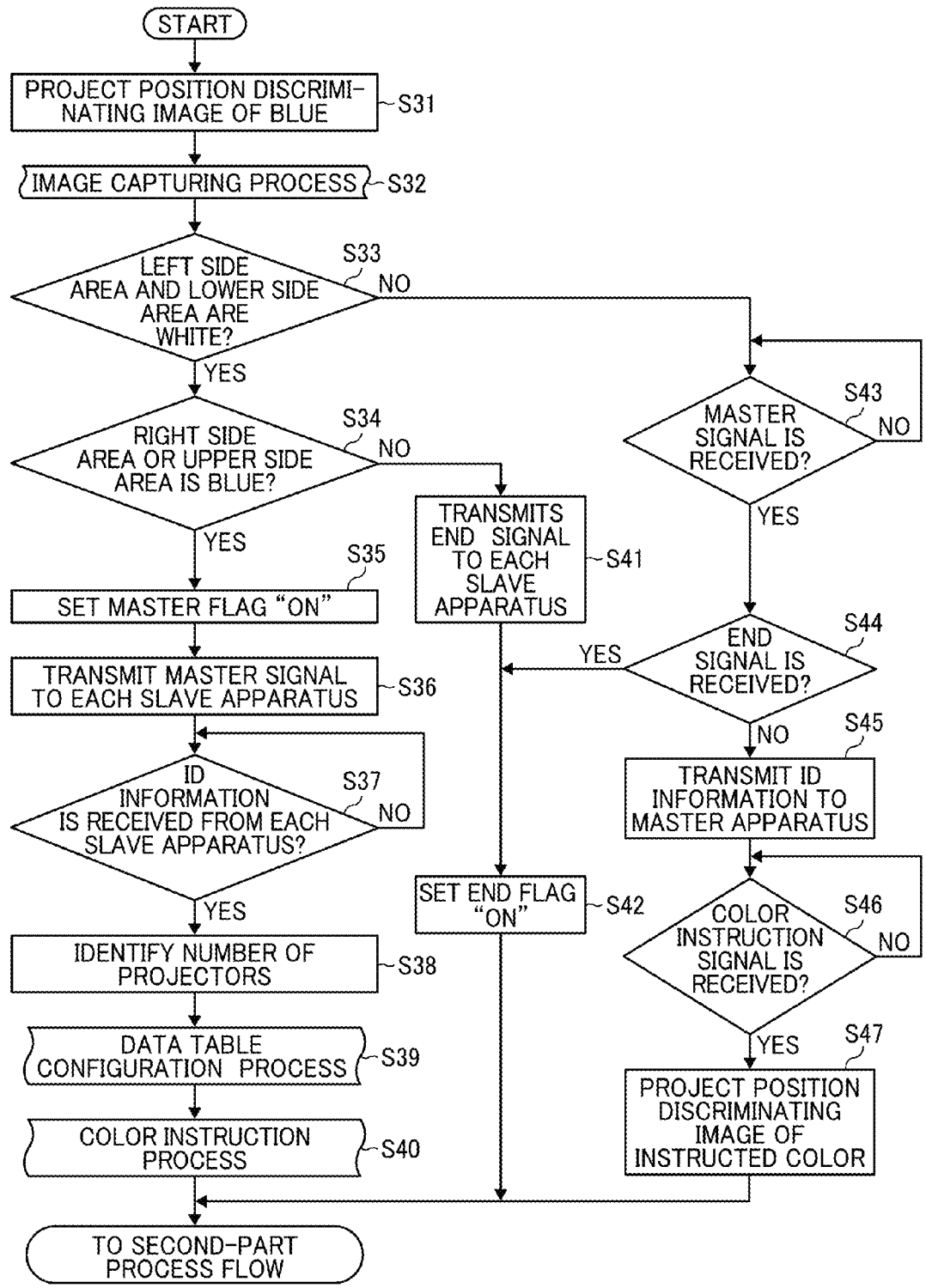
FIG. 11 is a flowchart showing the steps of a first-part processing of a position identification processing conductible by a control unit of a projector of the MP system of FIG. 10.

FIG. 11 is a flowchart showing the steps of a first-part processing of a position identification processing conductible by the control unit 4. When the position identification processing is started, the control unit 4 projects a position discriminating image of blue color using one data of a plurality of discriminant image data stored in the memory circuit (step S31), and conducts an image capturing process to acquire image information of the position discriminating image and the surrounding area of the position discriminating image (step S32).

Then, based on the acquired image information, the control unit 4 determines whether a left side area and a lower side area of the position discriminating image is white (step S33), which means that the control unit 4 determines whether the concerned projection position is at the left-bottom corner of the matrix. Further, the position discriminating image projected by the projector 1 at step S31 is not limited to a blue color image.

In the MP system 1000a, a projector that uses a segment at the left-bottom corner of the matrix as a projection position is referred to as a master apparatus. Each of projection positions of a plurality of the projectors 1 can be identified based on the master apparatus. Hereinafter, each of the projectors 1 other than the master apparatus is referred to as a slave apparatus.

The projector 1 that determines that the left side area and the lower side area are white at step S33 is the master apparatus, and the master apparatus conducts the process of step S34 and subsequent steps. By contrast, the projector 1 that determines that the left side area and the lower side area are not white at step S33 is a slave apparatus, and the slave apparatus conducts the process of step S43 and subsequent steps.

The master apparatus determines whether at least any one of a right side area of the position discriminating image or a upper side area of the position discriminating image is blue color (step S34), which means that the master apparatus determines whether a blue color position discriminating image is projected onto at least one of the upper side segment or the right side segment by the slave apparatus.

If the blue color position discriminating image is not projected onto any one of segments (step S34: No), it is determined that the projector 1 that is conducting projection is the master apparatus alone, and it is determined that a required number of the projectors 1 are not yet set. Then, the master apparatus transmits an end signal to each of the slave apparatuses (step S41), sets an end flag "ON" (step S42), and proceeds the process to a second-part processing.

By contrast, if the blue color position discriminating image is projected onto at least any one of the upper side segment and the right side segment by the slave apparatus (step S34: Yes), the master apparatus sets a master flag "ON" to set the concerned projector (i.e., master apparatus) as the master apparatus (step S35).

Then, the master apparatus transmits a combination of an identification (ID) information signal (as given signal), and a master signal to inform that the projector 1 that transmits the master signal is the master apparatus to each of the slave apparatuses (step S36), and waits to receive ID information signals to be transmitted from each of the slave apparatuses (step S37).

After receiving the ID information signal from all of the slave apparatuses (step S37: Yes), the number of received signals, indicating the number of slave apparatuses, is added with one, which is the master apparatus, to identify the number of projectors 1 employed for the MP system (step S38). In this process, the master apparatus can be used as a number identification unit that identifies the number of projectors 1 employed for the MP system.

Then, the master apparatus conducts a data table configuration processing (step S39). In this data table configuration processing, a data table listing a combination of ID information, peripheral identification pattern data, and projection position is configured for the number of projectors 1. At this stage, information determined for all of the projectors 1 is only ID information. Therefore, the peripheral identification pattern data and projection position are input with default data.

After configuring the data table, the master apparatus conducts a color instruction processing (step S40). In this color instruction processing, color information are selected for the number of projectors 1 from, for example, fifty color information stored in the memory circuit from the highest priority order, wherein color information is corresponded to each of the slave apparatuses, and a color instruction signal corresponding to the respective color information is transmitted to a respective slave apparatus corresponding to the respective color information. Each of colors is corresponded to a color of position discriminating image, and each of the slave apparatuses projects a position discriminating image by using the instructed color. Further, the master apparatus projects a position discriminating image having color different from color used for the slave apparatuses at step S50 to be described later.

Therefore, the control unit 4 of the master apparatus can function as a determination unit that determines position discriminating images to be projected by each of a plurality of the projectors 1. Upon completing the color instruction processing, the master apparatus proceeds the process to the second-part processing, to be described later.

After step S33, the slave apparatus waits the ID information signal and the master signal to be transmitted from the master apparatus (step S43). After receiving the ID information signal and the master signal (step S43: Yes), the slave apparatus checks whether an end signal is transmitted from the master apparatus and received (step S44).

If the end signal is received (step S44: Yes), the slave apparatus sets the end flag "ON" (step S42), and proceeds the process to the second-part processing, to be described later. By contrast, if the end signal is not received (step S44: No), the slave apparatus transmits ID information of the slave apparatus to the master apparatus (step S45), and waits to receive a color instruction signal to be transmitted from the master apparatus (step S46).

Then, after receiving the color instruction signal (step S46: Yes), the slave apparatus reads discriminant image data corresponding to the instructed color from the memory circuit, and projects a position discriminating image having the instructed color (step S47). Then, the slave apparatus proceeds the process to the second-part processing, to be described later.

Figure 12:
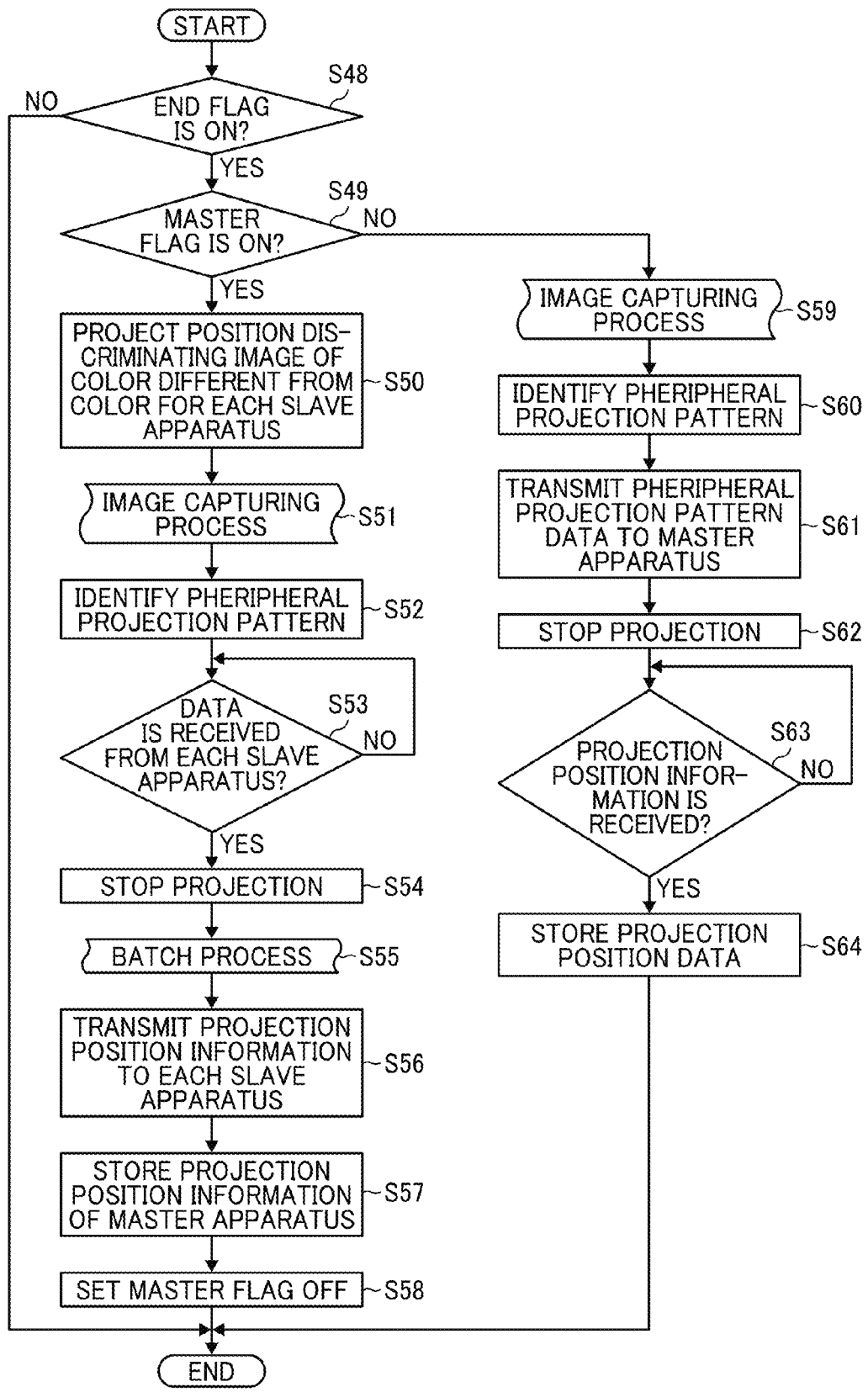
FIG. 12 is a flowchart showing the steps of a second-part processing of the position identification processing conductible by the control unit of the projector of the MP system of FIG. 10.

FIG. 12 is a flowchart showing the steps of the second-part processing of the position identification processing conductible by the control unit 4. In the second-part processing, the control unit 4 of the master apparatus determines whether the end flag is ON (step S48). If the end flag is ON (step S48: Yes), the control unit 4 of the master apparatus ends the position identification processing.

By contrast, if the end flag is not ON (step S48: No), the control unit 4 confirms that the concerned projector is the master apparatus (step S49: Yes), and the control unit 4 reads discriminant image data corresponding to a color different from a color used for each of the slave apparatuses from the memory circuit, and projects a position discriminating image using the color for the master apparatus (step S50).

Then, the control unit 4 conducts an image capturing process to acquire image information of a position discriminating image and a surrounding area of the projected position discriminating image of the master apparatus (step S51), and then the control unit 4 identifies a peripheral projection pattern based on the acquired image information (step S52).

Then, when peripheral projection pattern data is transmitted from each of the slave apparatuses, the control unit 4 stops projection of the position discriminating image (step S54), and conducts a batch process (step S55). In this batch process, a flow same as the flow from steps S6 to S12 in FIG. 7 is conducted. With this configuration, peripheral projection pattern data and projection position data of all of the projectors 1 including the master apparatus are input to the data table.

Then, the control unit 4 transmits projection position data or information to each of the slave apparatuses (step S56), and stores projection position data or information of the master apparatus, separately from the data table, in the memory circuit (step S57). Then, the control unit 4 sets the master flag "OFF" (step S58), and ends the position identification processing.

By contrast, the control unit 4 of the slave apparatus, which proceeds the process to the second-part processing, determines whether the end flag is ON (step S48). If the end flag is ON (step S48: Yes), the control unit 4 of the slave apparatus ends the position identification processing.

By contrast, if the end flag is not ON (step S48: No), the control unit 4 confirms that the concerned projector is the slave apparatus (step S49: Yes). Then, the control unit 4 conducts an image capturing process to acquire image information of the position discriminating image projected by the concerned slave apparatus and the surrounding area of the projected position discriminating image (step S59). Then, the control unit 4 identifies a peripheral projection pattern based on the acquired image information (step S60), and the control unit 4 transmits the peripheral projection pattern data and ID information of the slave apparatus to the master apparatus (step S61). Then, the control unit 4 stops projection of the position discriminating image (step S62).

When projection position data indicating a projection position of the concerned slave apparatus is transmitted from the master apparatus (step S63: Yes), the control unit 4 stores the projection position data in a memory circuit of the concerned slave apparatus (step S64), and ends the position identification processing.

After completing this processing, when a normal projection is to be conducted, the control unit 4 converts an image signal transmitted from the image signal output unit 40 to a divided image signal used for projecting a divided movie to a projection position of the corresponding concerned slave apparatus based on the projection position data stored in the memory circuit, and projects the divided image onto the screen 20.

Similar to the MP system 1000 of the above described example embodiment, as to the MP system 1000a of the variant example, even when an image projection area is segmented into four or more segments in the vertical or horizontal directions, projection positions can be identified for all of the projectors one by one. Further, different from the MP system 1000 of the above described example embodiment, the MP system 1000a of the variant example does not use an image signal distribution unit, with which the setting operation of the MP system can be simplified.

By contrast, the MP system 1000 of the above described example embodiment uses the image signal distribution unit 30, with which each one of the projectors 1 does not need to conduct a conversion process of an image signal to a divided image signal, and does not need to store a plurality of discriminant image data, with which a plurality of the projectors 1 can be provided with lesser cost.

A description is given of the MP system 1000 of the above described example embodiment added with useful function, which may be referred to a function-added MP system. A hardware configuration of the function-added MP system 1000 is same as the above described MP system 1000 of the above described example embodiment.

As to the MP system 1000 of the above described example embodiment, the screen 20 having white color is used as an image projection target, onto which an image is projected. If the image projection target of not-white such as wall of buildings, blackboards is used, a blank area not projected with position discriminating images may not be recognized, and thereby projection positions of each of the projectors 1 cannot be identified.

FIG. 13 is a schematic view of a relationship of position discriminating images and peripheral projection patterns when a blackboard 70 in a class room is used as the image projection target. Although the blackboard 70 is referred to "black," the blackboard 70 has a surface colored by green actually. Therefore, as illustrated in FIG. 13, when position discriminating images of single colors, mutually different with each other, are projected onto nine segments on the blackboard 70, color of each of position discriminating images becomes a green-mixed color instead of an original single color. Further, a blank area at peripheral portions of the blackboard 70 becomes green as illustrated in FIG. 13.

Since a blank area, which is an upper side area of three segments of the first line, is not white, the MP system 1000 of the above described example embodiment cannot recognize the three segments as segments of the first line. Further, since a blank area, which is a lower side area of three segments of the third line, is not white color, the MP system 1000 of the above described example embodiment cannot recognize the three segments as segments of the third line. Similarly, the MP system 1000 of the above described example embodiment cannot recognize three segments in the first row as segments of the first row, and further, cannot recognize three segments in the third row as segments of the third row.

Therefore, before determining position discriminating images to be projected by each one of the nine projectors 1, the image signal distribution unit 30 of the function-added MIP system conducts background color identification processing for identifying a background color of the image projection target in cooperation with the projector 1. The background color identification processing is conducted using one of the nine projectors 1. The image signal distribution unit 30 transmits a background color identification command signal to one of the nine projectors 1. The control unit 4 of the projector 1, which receives the background color identification command signal, instructs the camera 11 to capture divided areas on the blackboard 70. The captured-image analyzing circuit 12 identifies a background color of the blackboard 70 based on the captured image result, and an identification result is transmitted to the image signal distribution unit 30 via the control unit 4.

Figure 14:
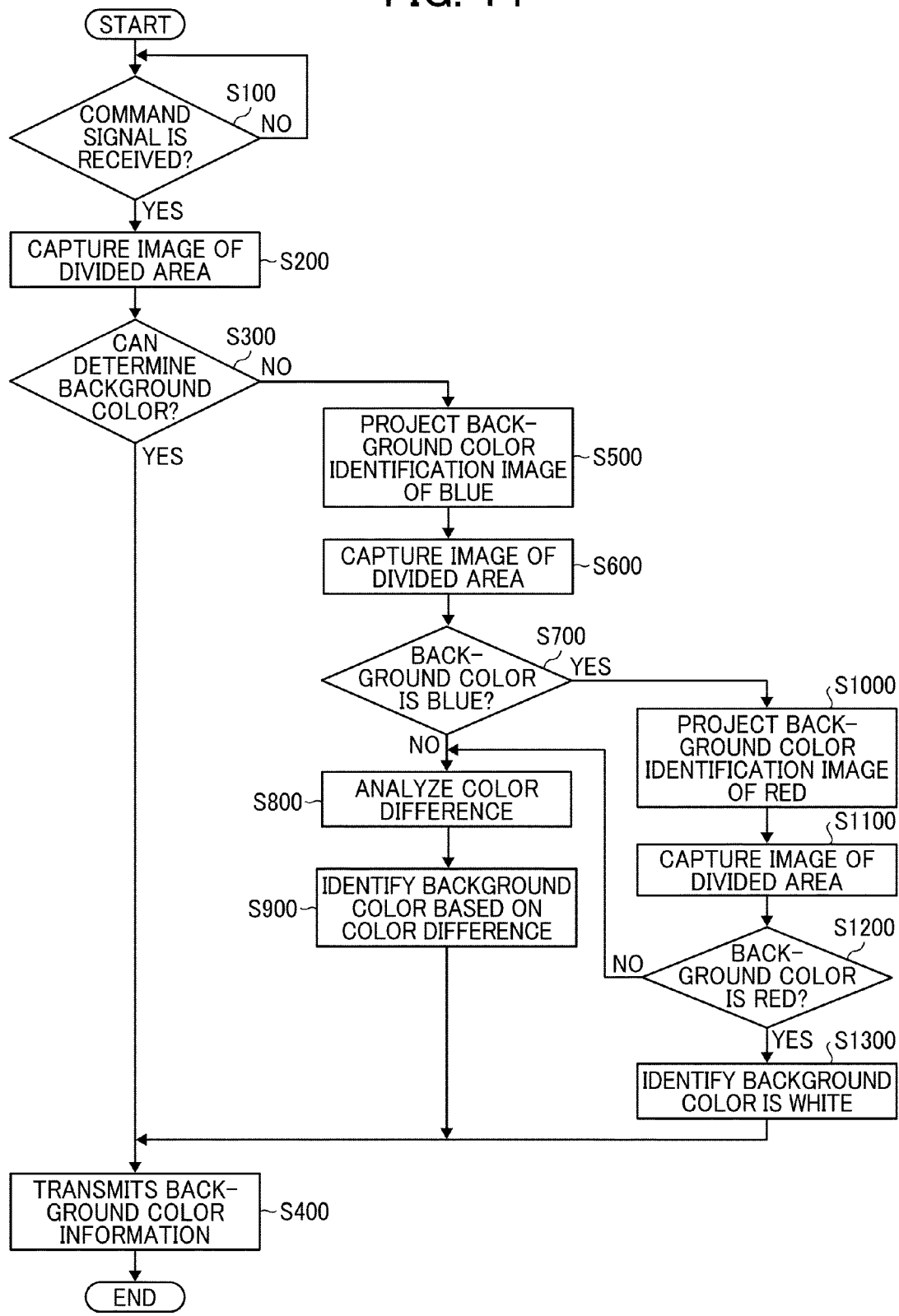
FIG. 14 is a flowchart showing the steps of processes conducted by a projector, which is a part of the steps of background color identification processing conductible collectively by an image signal distribution unit and the projector.

FIG. 14 is a flowchart showing the steps of processes conducted by the projector 1, which is a part of the steps of background color identification processing conductible collectively by using the image signal distribution unit 30 and the projector 1.

When a background color identification command signal is transmitted from the image signal distribution unit 30 (step S100: Yes), the control unit 4 of the projector 1 instructs the camera 11 to capture a divided area, which is a projection target area projected by the concerned projector 1, among all area of the blackboard 70 (step S200).

Then, the captured-image analyzing circuit 12 of the projector 1 determines whether image data acquired by the image capturing operation is data that can be used to determine a background color of the blackboard 70 (step S300). When the blackboard 70 is placed in a dark environment, a background color of the blackboard 70 cannot be determined based on the image data.

If the image data is data that can be used to determine the background color (step S300: Yes), the captured-image analyzing circuit 12 identifies the background color based on the image data, and then transmits the background color information to the image signal distribution unit 30 via the control unit 4 (step S400).

If the image signal distribution unit 30 determines that the acquired image data is data that is difficult to use to determine background color (step S300: No), the image signal distribution unit 30 transmits a result indicating difficulty of determination to the control unit 4. Then, the control unit 4 outputs an image signal to the image processor 2 based on image data stored in the memory 5 in advance, and projects a background color identification image of blue color onto a divided area on the blackboard 70 (step S500). The control unit 4 instructs the camera 11 to capture the projected background color identification image (step S600).

Then, based on the image data acquired by the capturing, the captured-image analyzing circuit 12 determines whether the background color of the blackboard 70 is blue (step S700). If the background color of the blackboard 70 is blue (step S700: Yes), the captured-image analyzing circuit 12 transmits information that the background color is blue to the control unit 4.

Then, the control unit 4 outputs an image signal to the image processor 2 based on image data stored in the memory 5 in advance, and projects a background color identification image of red onto the divided area on the blackboard 70 (step S1000). Then the control unit 4 instructs the camera 11 to capture the projected image used as the background color identification image (step S1100).

Then, based on the image data acquired by the capturing, the captured-image analyzing circuit 12 determines whether background color of the blackboard 70 is red (step S1200). If the background color of the blackboard 70 is red (step S1200: Yes), the captured-image analyzing circuit 12 identifies that the background color is white (step S1300), and transmits an identification result to the image signal distribution unit 30 via the control unit 4 (step S400).

By contrast, if the captured-image analyzing circuit 12 determines that the background color is not blue (step S700: No) or if the captured-image analyzing circuit 12 determines that the background color is not red (step S1200: No), the captured-image analyzing circuit 12 analyzes color difference between the background color and blue, or color difference between the background color and red (step S800). Then, the captured-image analyzing circuit 12 identifies the background color based on the color difference (step S900), and transmits an identification result to the image signal distribution unit 30 via the control unit 4 (step S400).

The image signal distribution unit 30, which receives the background color information from the control unit 4 of the projector 1, conducts processing to project position discriminating images having mutually different colors by using the nine projectors 1. Then, when peripheral identification pattern data is transmitted from each of the projectors 1, the image signal distribution unit 30 conducts the above described determination process of the number of rows, determination process of the number of lines, and identification process of position of projectors in the line direction. In these processes, the color of blank area is set to the background color transmitted from the control unit 4 instead of white. With this configuration, even if the background color of the image projection target is not white, projection positions of each of the projectors 1 can be identified correctly.

As to the function-added MP system of the above described example embodiment, the image signal distribution unit 30 and the projector 1 can collectively conduct the background color identification processing, and thereby a combination of the image signal distribution unit 30 and the projector 1 can function as a background color identification unit. However, the image signal distribution unit 30 alone can function as a background color identification unit, in which based on image data captured and transmitted from the projector 1, the image signal distribution unit 30 identifies background color. This configuration can omit the memory 5 to store image data of background color identification image, and a configuration to conduct determination process of background color based on the image data, with which this configuration can simplify the projector 1.

Each of the nine projectors 1 stores a color correction table in the memory 5. The color correction table is used to correct color of an output image based on a background color when the background color of the image projection target is not white. Specifically, the color correction table is used to correct color so that color of divided image projected onto the image projection target having the background color of non-white becomes similar to color of divided image projected onto the image projection target having the background color of white.

When a background color signal is transmitted from the image signal distribution unit 30, the control unit 4 of each of the projectors 1 conducts color correction, matched to the background color, to image data by referring the color correction table, and projects an image based on the corrected image data, in which the control unit 4 adjusts color of the input image data by converting color level using the color correction table.

As to the function-added MP system of the above described example embodiment, even if the image projection target has background color other than white, color of images projected onto the image projection target having the background color of non-white can be projected with same or similar color (e.g., color of images output from a source apparatus) when projecting images on the image projection target having background color of white such as a white screen.

The above described example embodiments have following configurations and effects.

Embodiment A

A multi-projection system includes a plurality of projectors, each one of the projectors useable for projecting each one of divided images onto projection positions (e.g., segments in a matrix) mutually different in an image projection area (e.g., a projection face on the screen 20), to project an image such as a large image composed of the divided images; a plurality of image capturing devices (e.g., camera 11) to capture the divided images projected by each one of the projector and a surrounding area of the divided image; a projection position identification unit (e.g., the image signal distribution unit 30 or the control unit 4) to identify a projection position of at least one or more of the plurality of projectors based on a plurality of captured image information acquired by capturing position discriminating images projected by the plurality of projectors onto mutually different projection positions and the surrounding area of the position discriminating images in the image projection area; a receiving unit (e.g., the communication terminal 13) to receive a given signal (e.g., protocol signal or ID information signal) transmitted from each one of the plurality of projectors; a number identification unit (e.g., the image signal distribution unit 30 or the control unit 4) to identify the number of the plurality of projectors based on a reception result of the receiving unit; a determination unit (e.g., the image signal distribution unit 30 or the control unit 4) to determine the position discriminating images to be projected by each one of the plurality of projectors based on an identification result of the number identification unit; a projection processing execution unit (e.g., the image signal distribution unit 30 or the control unit 4) to execute a process of projection of the position discriminating images determined by the determination unit to the plurality of projectors.

In this configuration, based on given signals transmitted from each one of projectors, the number of projectors is identified, and a position discriminating image to be projected by each one of the projectors is determined, and a process to project an image matched to the determination result is conducted. For example, as described in the example embodiments, image signals for projecting mutually different position discriminating images are output to each one of projectors, and as described as the variant example, mutually different color instruction signals are output to each one of projectors. By conducting these processing, a setting operation for projecting mutually different position discriminating images, conducted for each one of projectors by an user or operator in conventional systems, is not required. Therefore, a burden of user or operator can be reduced.

Embodiment B

As to embodiment B of embodiment A, the multi-projection system includes the determination unit that conducts a process of determining the position discriminating images, mutually different with each other, for the plurality of projectors as projection images, and the projection position identification unit that conducts a process of identifying a projection position for each one of the projectors based on a plurality of the captured image information and a determination result of the determination unit, In this configuration, a plurality of projectors projects mutually different position discriminating images onto mutually different projection positions, and a plurality of peripheral projection pattern data is corresponded to each one of a plurality of projectors. This peripheral projection pattern data does not simply indicate existence or non-existence of other position discriminating image at a surrounding area of the concerned position discriminating image.

Rather, by acquiring existence or non-existence of other position discriminating image and also color and/or shape of each one of position discriminating images if other position discriminating image exists around the concerned position discriminating image, this peripheral projection pattern data includes information of existence or non-existence of other position discriminating image and feature unique to each one of position discriminating images such as color and/or shape of each each one of position discriminating images. With this configuration, even when an image projection area is segmented into four or more segments into the vertical or horizontal directions, mutually different peripheral projection pattern data can be set for all of segments, and thereby projection positions of all of segments can be identified.

Embodiment C

As to embodiment C (e.g., variant example) of embodiment A or B, in the multi-projection system, the projection position identification unit (e.g., the control unit 4), the receiving unit (e.g., the communication terminal 13), and the number identification unit (e.g., the control unit 4) are disposed for each one of the plurality of projectors. In this configuration, it is not required to provide an image signal distribution unit for the MP system, with which setting operation of the whole system can be simplified.

Embodiment D

As to embodiment D of embodiment A or B, in the multi-projection system, the projection position identification unit (e.g., the image signal distribution unit 30), the receiving unit (e.g., LAN connector of the image signal distribution unit 30), and the number identification unit (e.g., the image signal distribution unit 30) are disposed separately from each one of the plurality of projectors. In this configuration, it is not required to convert an image signal into a divided image signal at each one of a plurality of projectors, and it is not required to store a plurality of discriminant image data at each one of a plurality of projectors, with which a plurality of projectors can be provided with lesser cost.

Embodiment E

As to embodiment E of embodiments A to D, the multi-projection system includes a background color identification unit (e.g., the projector 1 and the image signal distribution unit 30) that identifies background color of the divided area based on a capturing result of the divided area captured by at least any one of the plurality of the image capturing devices before conducting determination by the determination unit, and the projection position identification unit that conducts a process of identifying a projection position of at least one or more of the projectors based on an identification result of the background color identification unit and the plurality of captured image information. In this configuration, even if a background color of an image projection target is not white, projection positions of each one of the projectors can be identified correctly.

Embodiment F

As to embodiment F of embodiment E, when the background color determination based on the capturing result is not conductible, a process of projecting a background color identification image onto the divided area corresponding to the capturing result is conducted, and then the background color identification unit conducts a process of identifying the background color based on color difference between the background color identification image and the background color identification image of original color captured by the image capturing device. In this configuration, even if an image projection target is placed under a dark environment, background color of the image projection target can be correctly identified.

Embodiment G

As to embodiment G of embodiments E or F, the multi-projection system includes a color correction unit that corrects color of the divided images projected by each one of the plurality of projectors based on the background color identified by the background color identification unit. In this configuration, images can be projected on the image projection target having any background color with the same or similar color when projecting images on the image projection target having the background color of white such as a white screen.

As to be above described example embodiments, a multi-projection system that can reduce a burden of a user or operator for setting projection positions of projectors can be provided.

The present invention can be implemented in any convenient form, for example using dedicated hardware, or a mixture of dedicated hardware and software. Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A multi-projection system, comprising:
   a plurality of projectors, each one of the projectors useable for projecting each one of divided images onto a corresponding each one of projection positions mutually different in an image projection area to project an image composed of the divided images;
   a plurality of image capturing devices, each one of the image capturing devices disposed for each one of the projectors, to capture the divided image projected by each one of the projector and a surrounding area of the divided image;
   a projection position identification unit to identify a projection position of at least one or more of the plurality of projectors based on a plurality of captured image information acquired by capturing position discriminating images projected by the plurality of projectors onto mutually different projection positions and a surrounding area of the position discriminating images in the image projection area;
   a receiving unit to receive a given signal transmitted from each one of the plurality of projectors;
   a number identification unit to identify the number of the plurality of projectors based on a reception result of the given signal by the receiving unit;
   a determination unit to determine the position discriminating images to be projected by each one of the plurality of projectors based on an identification result of the number identification unit; and
   a projection processing execution unit to execute a process of projection of the position discriminating images determined by the determination unit to the plurality of projectors.

2. The multi-projection system of claim 1, wherein the determination unit conducts a process of determining the position discriminating images, mutually different with each other, for the plurality of projectors as projection images, and
   the projection position identification unit conducts a process of identifying a projection position for each one of the projectors based on a plurality of the captured image information and a determination result of the determination unit.

3. The multi-projection system of claim 1, wherein the projection position identification unit, the receiving unit, and the number identification unit are disposed for each one of the plurality of projectors.

4. The multi-projection system of claim 1, wherein the projection position identification unit, the receiving unit, and the number identification unit are disposed separately from each one of the plurality of projectors.

5. The multi-projection system of claim 1, further comprising:
- a background color identification unit to identify background color of the divided area based on a capturing result of the divided area captured by at least any one of the plurality of the image capturing devices before conducting determination by the determination unit, and
- the projection position identification unit conducts a process of identifying a projection position of at least one or more of the projectors based on an identification result of the background color identification unit and the plurality of captured image information.

6. The multi-projection system of claim 5, wherein when the background color determination based on the capturing result is not conductible, a process of projecting a background color identification image onto the divided area corresponding to the capturing result is conducted, and then the background color identification unit conducts a process of identifying the background color based on color difference between the background color identification image captured by the image capturing device and the background color identification image of original color.

7. The multi-projection system of claim 5, further comprising:
- a color correction unit to correct color of the divided images projected by each one of the plurality of projectors based on the background color identified by the background color identification unit.

\* \* \* \* \*